July 23, 1946.　　　D. L. CHANDLER　　　2,404,432
VENTILATOR MECHANISM FOR AUTOMOBILE DOORS
Filed Dec. 7, 1944　　　4 Sheets-Sheet 4
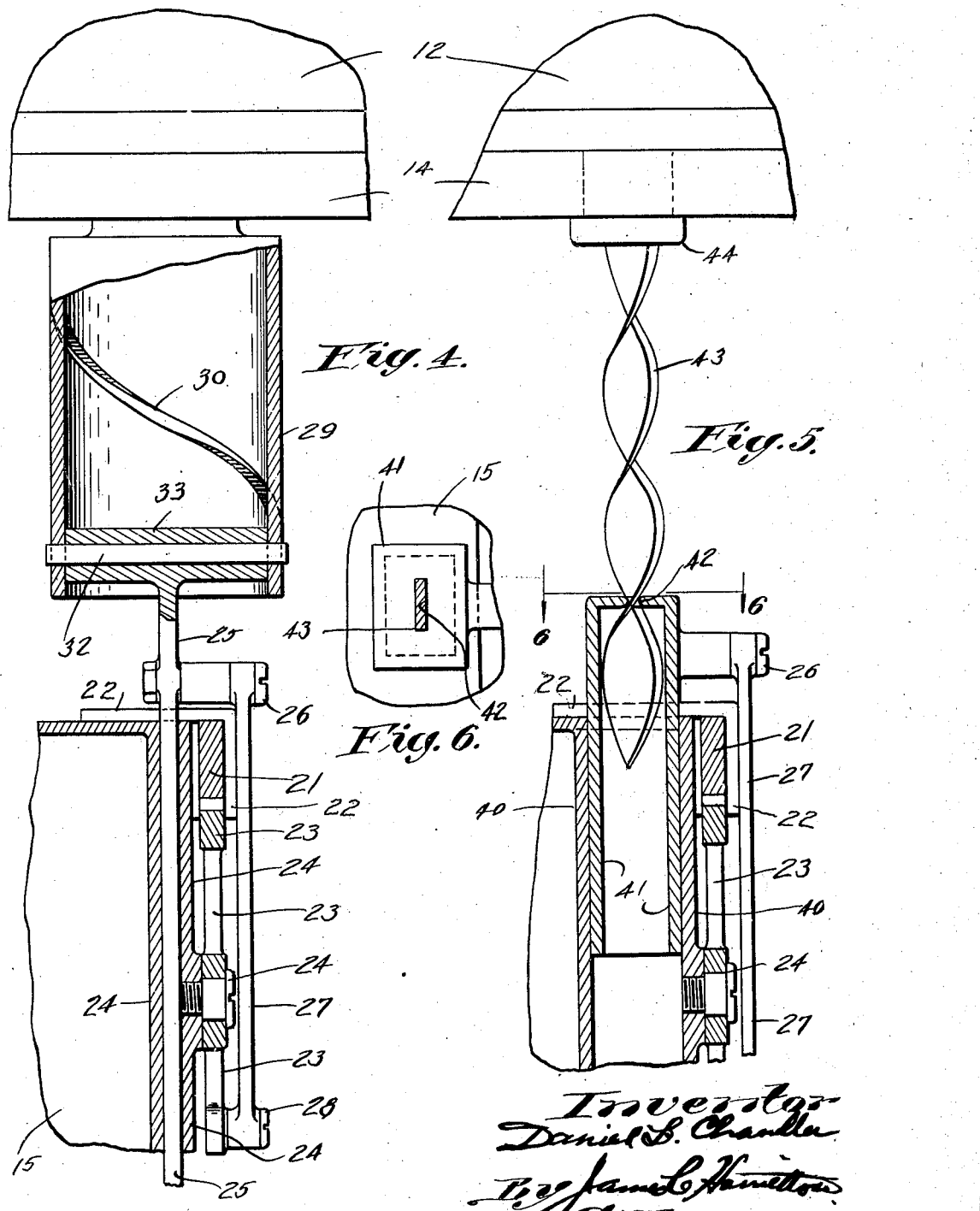

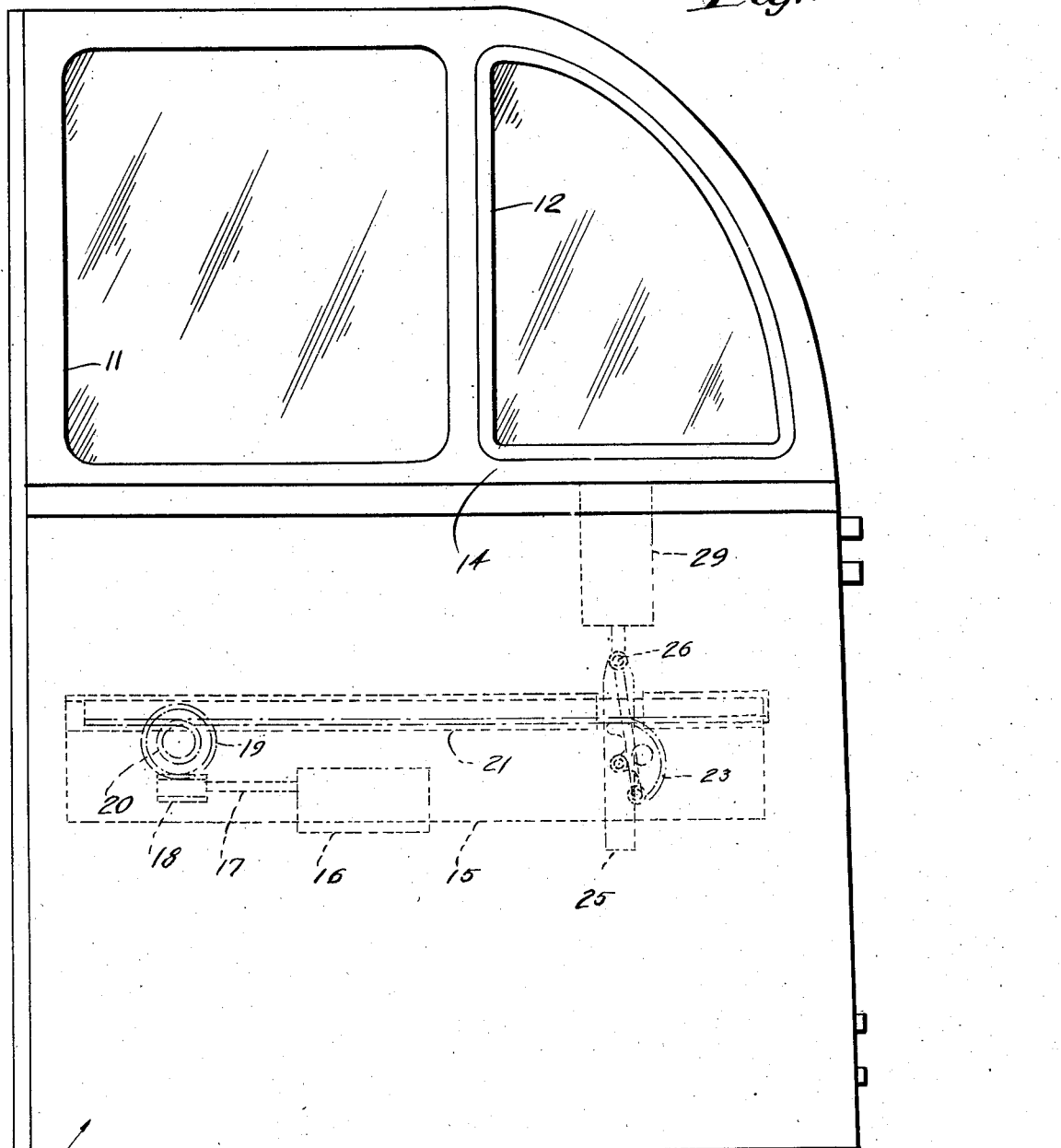

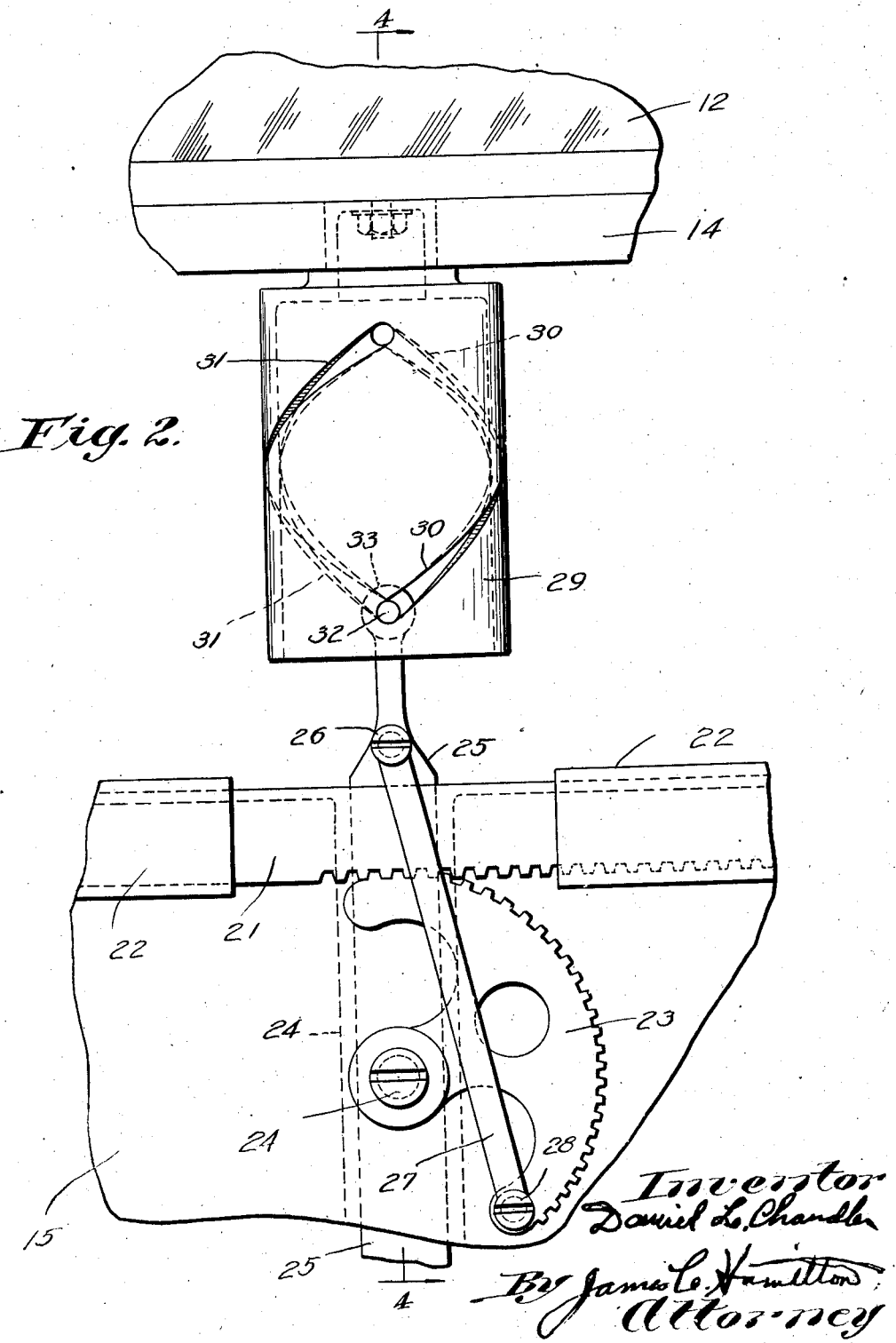

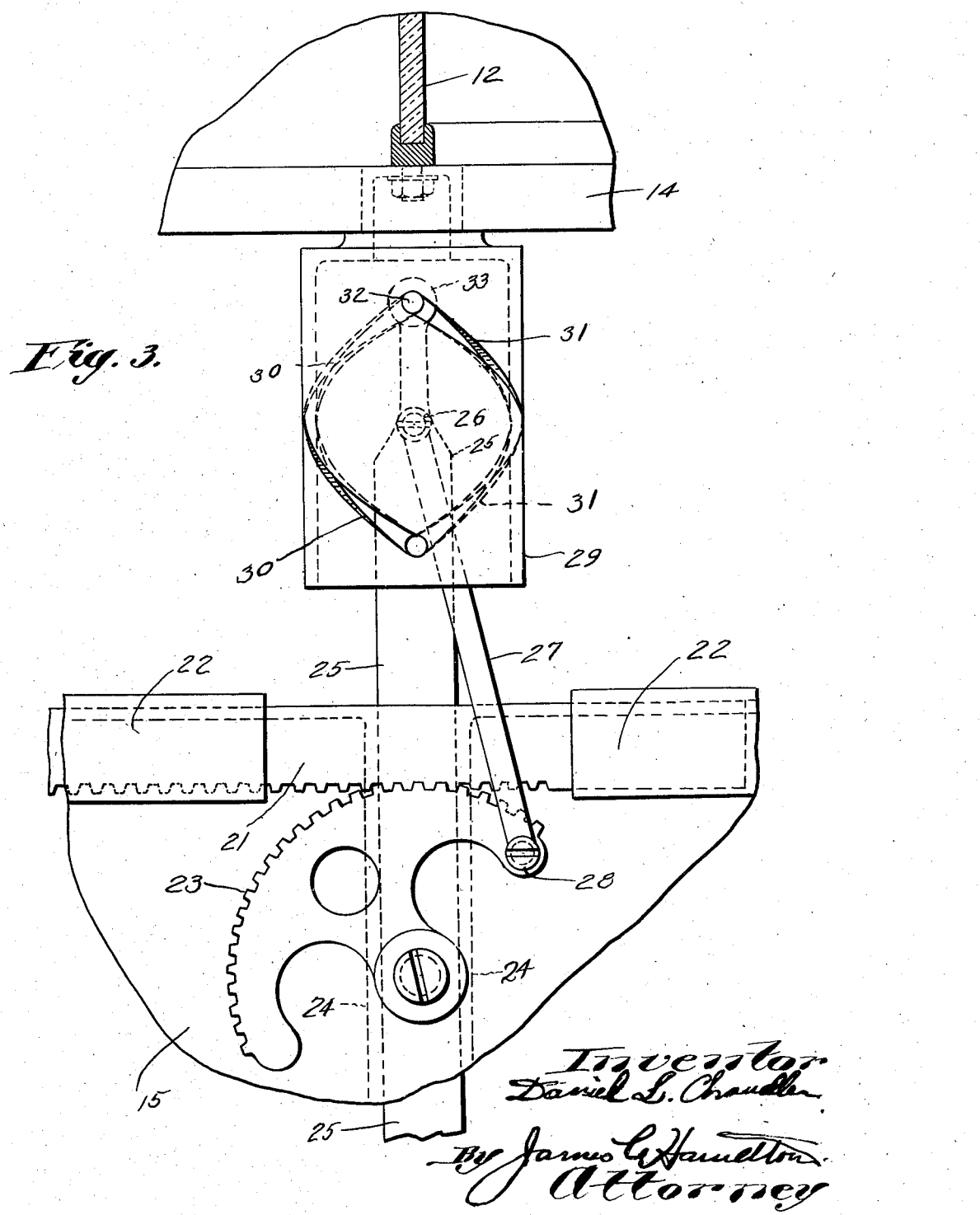

Patented July 23, 1946

2,404,432

UNITED STATES PATENT OFFICE 2,404,432

VENTILATOR MECHANISM FOR AUTOMOBILE DOORS

Daniel L. Chandler, Salem, Mass., assignor to Aresee Company Inc., Swampscott, Mass., a corporation Application December 7, 1944, Serial No. 567,095

5 Claims. (Cl. 268—120)

My present invention relates to automobile door windows and more particularly to automobile door window ventilators which are electrically operated from a remote control electrical switch located on the door panel or on some other place within the automobile door.

It is a well-known fact that in the present-day development of automobiles and other modern mechanisms that there is a growing demand and inclination toward electrically operated devices sometimes referred to, in the trade, as "push button control."

It is evident to all that devices which are convenient and easily operated are the devices sought by the great majority of individuals; therefore the present invention has been developed and perfected for the purpose of attempting to satisfy this growing demand.

It is also quite evident that certain mechanical results must be obtained in any device of this nature if it is to be offered the public in a motor vehicle. Certain of these results are hereinafter pointed out in the following specification.

The principal object of my invention is an improved ventilator operating device for automobile window ventilators and the like;

Another object is an improved automobile window ventilator which is electrically operated;

Still another object is an improved automobile window ventilator which is electrically operated and in which the said ventilator is at all times locked against operation from the ventilator end or, in other words, cannot be operated excepting from the inside area of the automobile by means of an electrical switch therein mounted;

A still further object is an improved automobile door ventilator which is electrically operated from the inside of the vehicle which not only opens the ventilator but closes it and which leaves the ventilator in a locked condition at any point of operation such that the ventilator cannot be operated in either direction excepting by the manipulation of the control switch located within the vehicle, and Other objects and novel features comprising the construction and the operation of the improved automobile window ventilator control mechanism will be apparent as the description and operation of the same progresses.

In the drawings illustrating the preferred embodiment of my invention:

Fig. 1 is a side elevation of an automobile door in which I have indicated a conventional window ventilator, the dotted lines indicating the major outlines of the mechanism which is located within the panel area of the door, certain parts of which are engaged with the ventilator window;

Fig. 2 is an enlarged fragmentary elevation of the window ventilator mechanism as viewed from the opposite side of said mechanism which is indicated in Fig. 1 in dotted lines, portions of the connecting apparatus being broken away for the purpose of convenience;

Fig. 3 is another enlarged fragmentary elevation, portions of which are broken away for convenience, being similar to Fig. 2 but showing the apparatus in a different position from that shown in Fig. 2;

Fig. 4 is a vertical cross-section taken on the line 4—4 of Fig. 2. Portions of this figure are broken off for convenience, as in previous figures and other portions of which are shown in elevation;

Fig. 5 is a modification of the apparatus shown in Figs. 1 to 4 inclusive. In this figure, as in previous figures, certain portions are broken away for convenience and other portions are shown in part elevation and part cross-section, some portions of which are the same as in previous figures. In the present figure the operation of the window ventilator is attained in the same basic manner but by simpler means, and Fig. 6 is a cross-section taken on the lines 6—6 of Fig. 5, portions of which are broken out for convenience and showing the top plan of the lower vertical sliding member.

Referring more in detail to the drawings, 10 indicates an automobile door in which is located the main window opening 11 and the ventilator window 12. The ventilator window 12 is of the swinging variety being pivoted at its bottom in the frame 14 of the door 10.

Located within the lower panel of the door 10 is a horizontally disposed housing 15 which is permanently attached to the door frame or the outer door panel whichever is most convenient or practical. Within this housing 15 is located a reversible electrical motor 16 from which extends a drive shift 17 on the free end of which is located a worm gear 18. The worm gear 18 is engaged with a worm wheel 19 which is pivoted within the housing 15. The electrical motor 15 is a reversible motor such that the worm wheel 19 may be operated in a clockwise direction or in a counterclockwise direction according to the desire of the operator. Any convenient reversible electrical switch may be used to reverse the said motor 16. For a more comprehensive disclosure of a specific drive mechanism, as indicated in the present drawings, reference is directed to my copending application Serial No. 519,599, filed January 25, 1944, in which the complete electrical motor drive is disclosed. However, in my present application I wish to point out that the present invention is not dependent upon the specific electrical drive shown in my above copending application as any reversible electrical motor drive may be used for the operation of the ventilator window 12 in which there is an equivalent of the driven worm wheel 19 on the driving axis of which there is a drive pinion, as the pinion 20 indicated in Fig. 1. For the purpose of the present application reversible driving power is derived from a pinion 20 mounted on the housing 15, the said pinion 20 is engaged with a rack member 21. The said rack member is supported in a horizontal slidable manner on the housing 15 by means of slide holding members such as those shown at 22. These slide members may be welded or otherwise affixed to the housing 15 in any convenient manner so that the rack 21 is horizontally slidable on the housing 15. On the end of the rack remote from the pinion 20 there is engaged a segmental gear which is pivoted on the housing by means of the stud 24 which is secured in the side of the housing 15, see Fig. 4. Within the housing 15 I have located a vertical slide-way in which is slidably engaged a slide member 25 which extends upwardly above the upper surface of the housing 15. At a point just above the top of the housing 15 on the slide 25 I have located another stud 26 which is secured in the slide 25 and on which is pivoted a connecting rod member 27. The opposite end of the connecting lever 27 is journalled around another stud indicated at 28 which is similar to the stud 27, the stud 28 being fixed to the lower portion of the segmental gear 23, as shown in the drawings.

On the lower side of the window ventilator member 12 I have fixed a cylinder member 29. This cylinder 29 may be journalled at its upper pivoted end in any convenient manner within the door frame 14 such that when the cylinder 29 is rotated within the frame of the door 10 the window ventilator 12 will swing in a horizontal plane either to the right or the left-hand side, as viewed in Fig. 3.

The cylinder 29 is provided with double spiral tracks 30 and 31 in which operates a pin member 32. By an inspection of Fig. 4 it will be noted that the pin member 32 is located in the upper portion of the slide member 25, as indicated at 33. This portion 33 of the slide 25 is comparable to a similar construction in the upper portions of a connecting rod in internal combustion engines and the pin which is tightly secured in the portion 33 is comparable to a wrist-pin of the said internal combustion engine, to the effect that when the slide member 25 is moved in a vertical direction the pin 32 will slide in the tracks 30 and 31 and because of the fact that the slide 25 cannot revolve, the cylinder which is revolvable in the door frame 14 will revolve; therefore the ventilator window 12 will be affected and caused to pivot in the door frame 14.

It will thus be seen that when the electrical motor 16 is operated in either of its two reversible directions, the rack 21 will slide in one or another opposite direction and thereby cause the cylinder 24 to rotate on its axis in a corresponding direction, thereby causing the ventilator member 12 to swing, either to a closed or an open position, as the case may be.

In Fig. 5 I have shown a slight modification of the apparatus in which that casing 15 is provided with a slightly different slideway 40 in which is positioned a slide member 41 which is hollow and in the head portion of which is located an orifice 42 through which is directed a spirally twisted flat bar member 43 which is secured to the member 44 permanently connected with the window ventilator portion 12. With the exception of the substitution of the member 43 for the cylinder 29 and the substitution of the hollow slide member 41 for the slide member 25 the rest of the apparatus is identical with that shown in Figs. 1 to 4.

In operation, the ventilator window 12 may be opened or closed, as the case may be, by means of the motor 16. When the motor 16 is electrically energized in one direction, the pinion 20 will move the rack 21 to the left-hand side, as shown in Fig. 3 thereby raising the connecting link 27 which causes the slide member 25 to slide upwardly in the slideways 24 located in the housing 15. When this action takes place, the transversally located pin fixed in the upper portion of the slide member 25 with end portions engaging in the spiral grooves 30 and 31 turns the cylinder 29 in the door frame 14 and thereby causes the ventilator window 12 which is attached to the cylinder 29 to swing open, as shown in Fig. 3. In a reverse manner the window 12 is closed when the direction of the reversible motor 16 is operated in the other direction returning the apparatus to the position shown in Fig. 2.

In the modification shown in Figs. 5 and 6 the cylinder 29 and slide 25 is substituted for by the spiral member 43 and 41 respectively, the rest of the mechanism being exactly the same and the same results are attained with the window 12 as previously described where the cylinder 29 is used.

For the purpose of simplicity I have shown my invention in very simple drawings in which the basic structure is set forth in its simplest forms; yet it is to be understood that I may vary the details of this strutcure for shop purposes or for production requirements within wide latitude without departing from the spirit of the invention.

Having thus described my invention what I claim as new is:

1. In an automobile door having a door frame and a swinging ventilator window, the combination of a reversible electric motor and driven pinion mounted in a housing located within said door, a rack member slidably mounted on said housing one end of which is engaged with said pinion and the other end of which is engaged with a segmental gear member pivoted on said housing, a slide member slidably located on said housing, a pivoted link member connecting said slide member with said gear member, a cylindrical member provided with spiral tracks located in the side of said cylinder one end of said cylinder being pivoted in said door frame and attached to said pivoted window, a cross-pin located through one end of said slide member and engaged with said cylinder tracks for the purpose of turning said cylinder and ventilator window when said slide is raised or lowered.

2. In an automobile door having a door frame and a swinging ventilator window, the combination of a reversible electric motor geared drive engaged with a horizontally slidable rack member mounted on a housing fixed within said door, a cylinder vertically mounted in said door frame having one end open and the other end fixed to said ventilator window and pivoted in said door frame, a slide member vertically mounted in said housing having one end extending into said cylinder, a cross-pin located in said slide the ends of which are slidably engaged in spiral tracks located in the sides of said cylinder, a link member pivoted at one end to said slide, the other end of said link being pivoted to a segmental gear pivoted on said housing, said gear being engaged with said rack for the purpose of raising and lowering said slide when said rack is moved horizontally, thereby rotating said cylinder and causing said window to swing.

3. In an automobile door having a frame and a swinging ventilator window, the combination of a reversible motor and motor-driven rack member mounted on a housing located in said door, a spiral-actuated member pivoted in said frame and attached at one end to said ventilator, a slide member engaged with said spiral member, said slide being linked to a pivoted member pivotally engaged with said rack member, said pivoted member engaging said slide member for the purpose of raising said slide and turning said spiral member which is attached to said ventilator window.

4. In an automobile door having a door frame and a pivoted ventilator window, the combination with a reversible electrically driven rack member mounted on a housing located in said door, a pivoted member located on said housing and engaged with said rack, a slide member located in said housing, a link member connecting said pivoted member with said slide for the purpose of sliding said slide member when said rack is moved, a pivoted member attached to said window and pivoted in said frame and having a spiral surface located thereon, means for engaging one end of said slide with said spiral surface for the purpose of rotating said spiral-surfaced pivoted member when said slide is operated.

5. In an automobile door having a pivoted ventilator window, a door frame and an internal housing located within said door on which is located an electrically operated horizontal rack member one end of which is engaged with a pivoted gear, a pivoted spirally tracked member attached to said window and pivoted in said frame, a slide member engaged with the spiral portion of said spirally tracked member, a crank member connected said slide member and said gear member for the purpose of raising and lowering said slide member on said spiral member when said rack is operated in a horizontal direction.

DANIEL L. CHANDLER.